United States Patent [19]
Ishizu

[11] Patent Number: 5,848,104
[45] Date of Patent: Dec. 8, 1998

[54] DEMODULATOR OF RECEIVER USED FOR COMMUNICATIONS

[75] Inventor: Fumio Ishizu, Tokyo, Japan

[73] Assignee: Mitsubishi Denki Kabushiki Kaisha, Tokyo, Japan

[21] Appl. No.: 760,566

[22] Filed: Dec. 4, 1996

[30] Foreign Application Priority Data

Feb. 27, 1996 [JP] Japan .................................. 8-039205

[51] Int. Cl.$^6$ ........................... H04L 27/22; H04B 17/00
[52] U.S. Cl. ......................... 375/324; 375/227; 375/365; 375/326; 375/344; 375/345; 455/245.1
[58] Field of Search .................................... 375/340, 365, 375/368, 329, 324, 334, 325, 326, 316, 344, 327, 345, 341, 227, 224; 329/304, 300, 372; 455/245.1, 21; 370/514

[56] References Cited

U.S. PATENT DOCUMENTS 5,335,348  8/1994  Kono ..................................... 455/192.2
5,376,894  12/1994  Petranovich ............................. 375/324

OTHER PUBLICATIONS

Shousei Yoshida and Hideho Tomita, "A New Coherent Demodulation Technique for Land–Mobile Satellite Communications", International Mobile Satellite Conference, Ottawa, 1990.

*Primary Examiner*—Stephen Chin
*Assistant Examiner*—Betsy L. Deppe

[57] ABSTRACT

A demodulator of the present invention includes a reception portion for receiving a communication signal including predetermined information outputted from a modulator; a correction parameter output portion connected to the reception portion for outputting a correction parameter based on the communication signal; a demodulated information output portion connected to the reception portion and the correction parameter output portion for outputting demodulated information based on the communicating signal and the correction parameter; a detector for detecting whether the demodulated information includes the predetermined information, for outputting a first signal when the predetermined information is detected and for outputting a second signal when the predetermined information is not detected; a storage portion connected to the detector for storing the correction parameter outputted from the correction parameter when the first signal is inputted, and for outputting the stored correction parameter to the correction parameter output portion when the second signal is inputted.

19 Claims, 8 Drawing Sheets

DEMODULATOR OF RECEIVER USED FOR COMMUNICATIONS

BACKGROUND OF THE INVENTION

1. Field of the Invention

The invention relates to a demodulator of receivers used in satellite communication, mobile communication, mobile satellite communication. More specifically, the invention relates to a demodulator in which the time required until handling the normal reception processing can be shortened when the signal are received again after fallen non-receiving state once.

2. Description of the Prior Art

A conventional example of the demodulator can be seen in a literature titled "A New Coherent Demodulation Technique for Land-Mobile Satellite Communications", International Mobile Satellite Conference, Ottawa, pp 622–627, 1990, and it is shown in FIG. 7. In FIG. 7, an analog-to-digital converter (hereinafter, referred to as A/D converter) 1 constitutes one of the reception portion 11. An intermediate frequency signal (hereinafter, referred to as IF signal) is inputted into the A/D converter 1. This IF signal is A/D-converted and outputted.

A digital quadrature detector 2 also constitutes one of the reception portion 11. The digital quadrature detector 2 is connected to the A/D converter 1, receives the output signal from the A/D converter 1, and outputs a base band signal of an in-phase component and a quadrature component according to the input signal.

A receiving filter 3 also constitutes one of the reception portion 11. This receiving filter 3 is connected to the digital quadrature detector 2, receives the base band signal outputted from the digital quadrature detector 2. This receiving filter 3 shapes waveform, and removes noise from an out-of-band.

A bit timing estimation circuit (hereinafter, referred to as bit timing recovery (BTR) circuit) 4 constitutes one of the correction parameter output portion 12. This BTR 4 is connected to the receiving filter 3, receives signal outputted from the receiving filter 3. Then BTR 4 estimates timing of decision (hereinafter, referred to as Nyquist point) according to the input signal, and outputs its result as a correction parameter.

An interpolation processing portion 5 constitutes one of the demodulated information output portion 13. This interpolation processing portion 5 is connected to the receiving filter 3 and BTR 4, and receives signal outputs from both the receiving filter 3 and the BTR 4, and generates a signal at a timing of Nyquist point from the signal outputted from the receiving filter 3, according to the signal outputted from BTR 4.

A first multiplier 6 also constitutes one of the demodulated information output portion 13. This first multiplier 6 is connected to the interpolation processing portion 5 and an automatic frequency control circuit (hereinafter, referred to as AFC) 7, receives the signal outputted from the interpolation processing portion 5 and the AFC 7, and removes signal components outputted from the AFC 7 from the signal outputted from the interpolation processing portion 5.

AFC 7 also constitutes one of the correction parameter output portion 12. This AFC 7 is connected to the first multiplier 6, receives the signal outputted from the first multiplier 6, estimates the frequency deviation of the input signal, and outputs signal based on this frequency deviation as a correction parameter.

A carrier phase estimation circuit (hereinafter, referred to as CR) 8 also constitutes one of correction parameter output portion 12. This CR 8 is connected to the first multiplier 6, receives the signal outputted from the first multiplier 6, estimates phase difference based on the input signal, and outputs a signal based on this phase difference as a correction parameter.

A second multiplier 9 also constitutes one of the demodulated information output portion 13. This second multiplier 9 is connected to the first multiplier 6 and the CR 8, receives the signal outputted from the first multiplier 6 and the CR 8, rotates the signal outputted from the first multiplier 6 in accordance with the signal from the CR 8, and performs coherent detection.

The operation of the demodulator shown in FIG. 7 is explained in the followings. First, the IF signal from the modulator is inputted into A/D converter 1, and is A/D-converted. The signal outputted from the A/D converter 1 is inputted into the digital quadrature detector 2 according to input signal, outputs signals of in-phase component and of quadrature component.

The digital quadrature detector 2 converts the input signal into an in-phase component $I_{QC}$ (nT) of the base band signal and into a quadrature component $Q_{QC}$ (nT) of the base band signal and outputs them. During this process, quasi-coherent detection is performed on the output signal.

An output signal from the digital quadrature detector 2 is obtained as following formulas (1);

$$I_{QC}=I(nT) \cos (\Delta\omega nT+\theta)-Q(nT) \sin (\Delta\omega nT+\theta)$$

$$Q_{QC}(nT)=Q(nT) \cos (\Delta\omega nT+\theta)+I(nT) \sin (\Delta\omega nT+\theta) \quad (1)$$

where, I(nT) represents the in-phase component of the signal outputted from modulator, Q(nT) represents the quadrature component of the signal outputted from modulator.

T represents the sampling period for generating the in-phase component signal and the quadrature component signal which are outputted from the digital quadrature detector 2. Normally this sampling period T is included in the received signal, and it is set to approximately ¼ of Symbol period.

The sampling period T does not synchronize with the Symbol period of the received signal, and the sampled data does not necessarily include the data sampled at the Nyquist point. $\Delta\omega$ represents a frequency deviation of received signal. In addition, $\theta$ represents an initial phase difference between the received signal and the oscillator included in the digital quadrature detector 2. n indicates an n-th sample time during the period T.

The base band signal which is outputted from the digital quadrature detector 2 is inputted into the receiving filter 3. The receiving filter 3 shapes waveform and removes the noise of the out-of-band. The signal outputted from receiving filter 3 is inputted into BTR 4. The BTR 4 estimates the timing of Nyquist point (*) according to the input signal.

The signals outputted from the receiving filter 3 and the BTR 4 are inputted into the interpolation processing portion 5. This interpolation processing portion 5 generates and outputs a signal at the Nyquist point by interpolation processing, using the signal outputted from the receiving filter 3 and the timing information at Nyquist point outputted from the BTR 4.

As an interpolation processing methods, for example, the first order and the second order interpolations of Lagrange'ss equation are well-known. However, a higher order interpolation processing method may also be used. In FIG. 8, an example of processing operation of interpolation processing portion 5 is shown. The signal sampled with sampling period T is inputted into the interpolation processing portion 5, which is indicated from the time n−2 to the time n+2, but is not sampled at a timing of Nyquist point.

Then, in case that the Nyquist point is estimated to be the timing shown in FIG. 8 from the timing information of Nyquist point outputted from the BTR 4, a signal ($I_{Nm}$), which is estimated to have been detected if sampled at Nyquist point, is generated and outputted, based on the data ($I_n$) sampled at the timing (n) immediately before the timing of Nyquist point and the data ($I_{n+1}$) sampled at the timing (n+1) immediately after the timing of Nyquist point.

The output signal outputted from interpolation processing portion 5 is represented as a following formulas (2);

$$I_N(mT_S)=I(mT_S) \cos(\Delta\omega mT_S+\theta_N)-Q(mT_S)\sin(\Delta\omega mT+\theta_N)$$
$$Q_N(mT_S)=Q(mT_S)\cos(\Delta\omega mT_S+\theta_N)+I(mT_S)\sin(\Delta\omega mT_S+\theta_N) \quad (2)$$

where, $T_S$ represents the Symbol period, θ N represents a phase difference component in the signal sampled at the Nyquist point. $I_N(mT_S)$ represents the in-phase component signal outputted from the interpolation processing portion 5, and $Q_N(mT_S)$ represents the quadrature component signal outputted from the interpolation processing portion 5. $I(mT_S)$ represents the in-phase component signal outputted from modulator, $Q(mT_S)$ represents the quadrature component signal outputted from the modulator. m indicates the m-th sample time in the period $T_S$.

The formula (2), which represents the signal outputted from the interpolation processing portion 5, is expressed in the form of complex signal as in the following formula (3).

$$R_N(mT_S) = I_N(mT_S)+jQ_N(mT_S) \quad (3)$$
$$= \{I(mT_S)+jQ(mT_S)\}\exp\{j(\Delta\omega mT_S+\theta_N)\}$$

In FIG. 8, the signal is processed by the sampling period having approximately ¼ of Symbol period, until the signal is inputted into the interpolation processing portion 5. After the interpolation processing portion 5, the signal is outputted by the Symbol period sampled at Nyquist point.

The signal outputted from the interpolation processing portion 5 is inputted into the AFC 7 via the first multiplier 6. The AFC 7 estimates a frequency deviation component Δω of input signal based on the input signal, and outputs the signal $C_{AFC}(mT_S)$ which is used to remove the frequency deviation component of the input signal. The signal outputted from AFC 7 is represented as a following formula (4).

$$C_{AFC}(mT_S)=exp(-j\Delta\omega mT_S) \quad (4)$$

The first multiplier 6 multiplies the signal (formula (2)) outputted from the interpolation processing portion 5 and the signal (formula (4)) outputted from AFC 7, and removes the frequency deviation component Δω which is included in the signal (formula (2)) outputted from the interpolation processing portion 5. That is, the signal outputted from the first multiplier 6 is represented in the following formula (5).

$$R_{AFC}(mT_S) = R_N(mT_S) \times C_{AFC}(mT_S) \quad (5)$$
$$= \{I(mT_S)+jQ(mT_S)\}\exp(j\theta_N)$$

The signal outputted from the first multiplier 6 is inputted into the CR 8. The CR 8 estimates a phase difference component $\theta_N$ and outputs the signal $C_{CR}(mT_S)$ which is used to remove the phase difference component of the input signal, based on the input signal. That is, the signal outputted from the CR 8 is represented in the following formula (6).

$$C_{CR}(mT_S)=\exp(-j\theta_N) \quad (6)$$

The signals outputted from the first multiplier 6 and the CR 8 are inputted into the second multiplier 9. The second multiplier 9 multiplies the signals outputted from the first multiplier 6 and the CR 8, and removes the phase difference component $\theta_N$ included in the signal outputted from the first multiplier 6. In other words, the second multiplier 9 carries out the coherent detection and outputs an detection result S ($mT_S$) whose synchronization is established. That is, the signal outputted from the second multiplier 9 is indicated in the following formula (7).

$$S(mT_S) = R_{AFC}(mT_S) \times C_{CR}(mT_S) \quad (7)$$
$$= I(mT_S)+jQ(mT_S)$$

In the conventional demodulator, when fading or blockage does not occur and the normal signal is inputted continuously, there is no problem at all as explained above. However, if fading or blockage occurs and signal is not inputted, the sampling timing of the input signal cannot be recognized. As a result, the synchronization which is established when the signal is existed loses its order. If the synchronization loses its order, the BTR 4, AFC 7, CR 8 and so on estimate the correction parameter on the basis of noise which is continuously inputted even if no signal is inputted. Therefore, the value of the correction parameter used for demodulating the signal is different from that in the normal condition.

Even after the fading or blockage disappears and the signal starts to be inputted again, the BTR 4, AFC 7, CR 8 output at first the correction parameters estimated on the basis of the noise. Then, the BTR 4, AFC 7, CR 8 estimate the correction parameters for demodulating the input signal. However, until the correction parameter, which is estimated based on the noise, returns to the correction parameter having the normal value, the signal from the reception portion 11 is inputted continuously, and then an appropriate demodulation is carried out by repeating a plurality of estimations.

Without this process of re-estimating the correction parameter for demodulating the input signal, it becomes possible neither to establish the synchronization of the input signal nor to demodulate. In this manner, when fading or blockage occurs in the conventional demodulator, there is problems that it takes time to establish the synchronization again, and that synchronization sometimes becomes impossible.

It is an object of the present invention to obtain a demodulator which shortens the time until the BTR 4, AFC 7, CR 8 operate to try the synchronization again and the synchronization is quickly established, when the signal is inputted again after the signal has been lost by the fading or blockage.

SUMMARY OF THE INVENTION

According to one aspect of the invention, a demodulator of the present invention comprises a reception portion for receiving a communication signal including predetermined information outputted from a modulator; a correction parameter output portion connected to the reception portion for outputting a correction parameter based on the communication signal; a demodulated information output portion connected to the reception portion and the correction parameter output portion for outputting demodulated information based on the communicating signal and the correction parameter; a detector for detecting whether the demodulated information includes the predetermined information, for outputting a first signal when the predetermined information is detected and for outputting a second signal when the predetermined information is not detected; a storage portion connected to the detector for storing the correction parameter outputted from the correction parameter when the first signal is inputted, and for outputting the stored correction parameter to the correction parameter output portion when the second signal is inputted.

According to another aspect of the invention, each correction parameter output portion of the present invention is connected to the detector and each storage portion, the correction parameter output portion outputs the correction parameter inputted from the storage portion when the detector successively outputs the second signal, and outputs the correction parameter based on the communication signal inputted from the reception portion when the detector outputs the first signal.

According to further aspect of the invention, a demodulator of the present invention further comprises a reset signal output portion connected to the detector for outputting a reset signal when the detector successively outputs the second signal.

According to further aspect of the invention, a correction parameter of the present invention comprises any one of a parameter for controlling processing timing of communication signal, a parameter for controlling frequency, a parameter for controlling a phase of a carrier to correctly determine the data, and a parameter for controlling a gain of the pre-amplifier to make the receiving signal level.

According to further aspect of the invention, a predetermined information is a well known information signal which is periodically inserted in the signal outputted from the modulator.

According to still further aspect of the invention, a demodulator of the present invention comprises a reception portion for receiving a communication signal outputted from a modulator; a correction parameter output portion connected to the reception portion for outputting a correction parameter based on the communication signal; a demodulated information output portion connected to the reception portion and the correction parameter output portion for outputting demodulated information based on the communicating signal and the correction parameter; a level signal output portion connected to the reception portion for outputting a first signal when a receiving level of the communication signal is higher than a threshold level, and outputs a second signal when a receiving level of the communication signal is lower than a threshold level; and a storage portion connected to the level signal output portion for storing the correction parameter outputted from the correction parameter when the first signal is inputted, and for outputting the stored correction parameter to the correction parameter output portion when the second signal is inputted.

BRIEF DESCRIPTION OF THE DRAWINGS

The present invention will become more fully understood by the accompanying drawings which are given by way of illustration only, and thus are not limitative of the present invention, and wherein.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiment 1.

Figure 1:
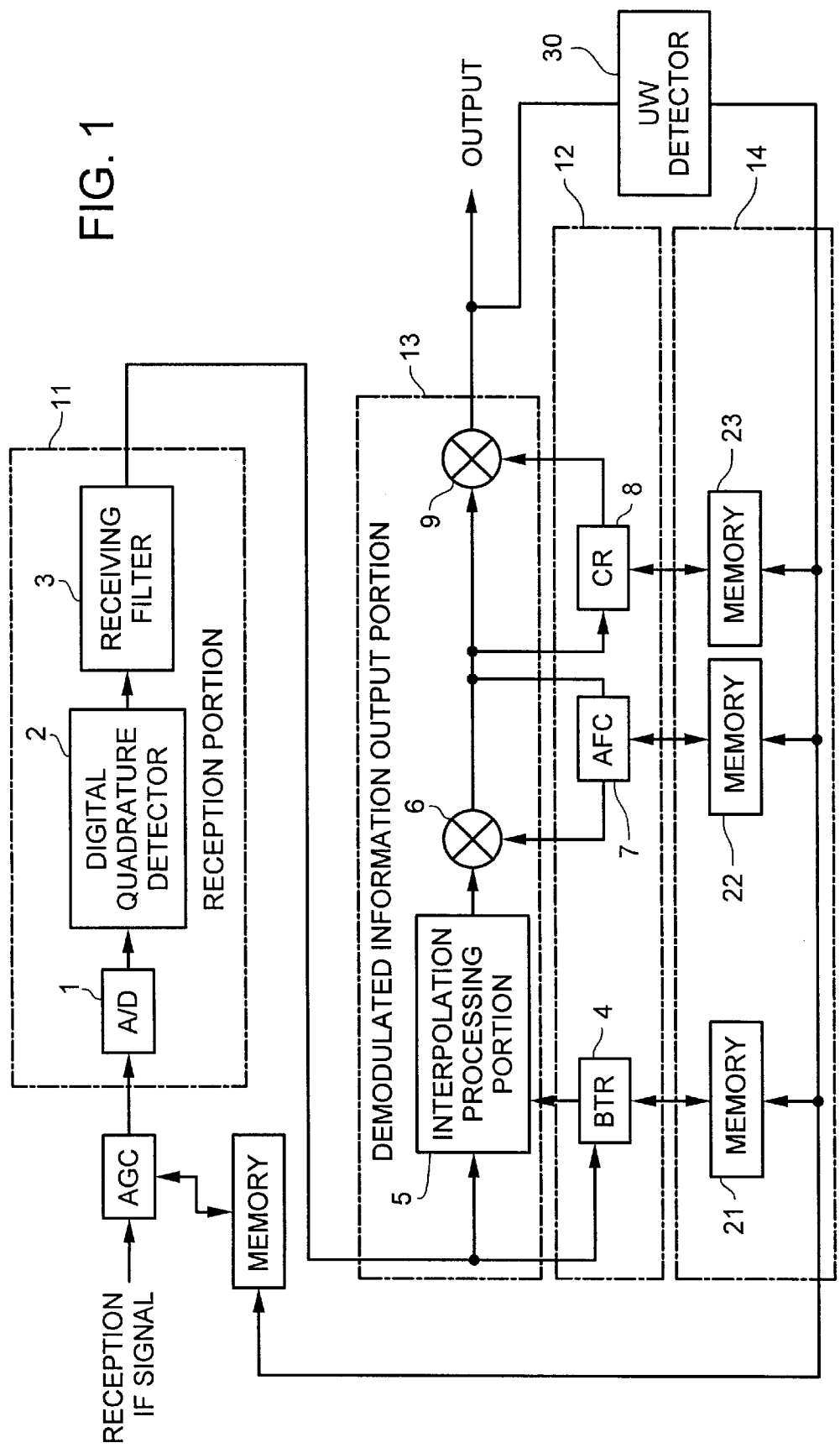
FIG. 1 shows a construction block diagram showing a first embodiment.

FIG. 1 shows one embodiment of the demodulator of this invention. In FIG. 1, UW (unique word) detector 30 detects the UW. The UW detector 30 is connected to the second multiplier 9. The UW detector 30 receives the signal which is outputted from the second multiplier 9, and judges whether the UW is detected or not. This UW is a fixed pattern usually inserted periodically in advance at the transmitting side in order to establish the synchronization with the input signal. The UW detector 30 outputs a first signal when the UW is detected, and a second signal when the UW is not detected, to a BTR memory 21, an AFC memory 22, and to a CR memory 23, respectively.

The BTR memory 21 constitutes one of a storage portion 14. This BTR memory 21 is connected to the UW detector 30 and the BTR 4. When the first signal is outputted from the UW detector 30, the BTR memory 21 stores the BTR parameter, which is the timing information estimated at Nyquist point, into the BTR 4. And when the second signal is outputted from UW detector 30, the BTR memory 21 outputs the BTR parameter, which is stored in the BTR memory 21, to the BTR 4.

The AFC memory 22 constitutes one part of the storage portion 14. This AFC memory 22 is connected to the UW detector 30 and the AFC 7. When the first signal is outputted from the UW detector 30, the AFC memory 22 stores AFC parameter, which is the information of deviation Δω of frequency estimated by the AFC 7, into the AFC memory 22 itself. When the second signal is outputted from the UW detector, the AFC memory 22 outputs the AFC parameter which is stored in the AFC memory 22, to the AFC 7.

Figure 7:
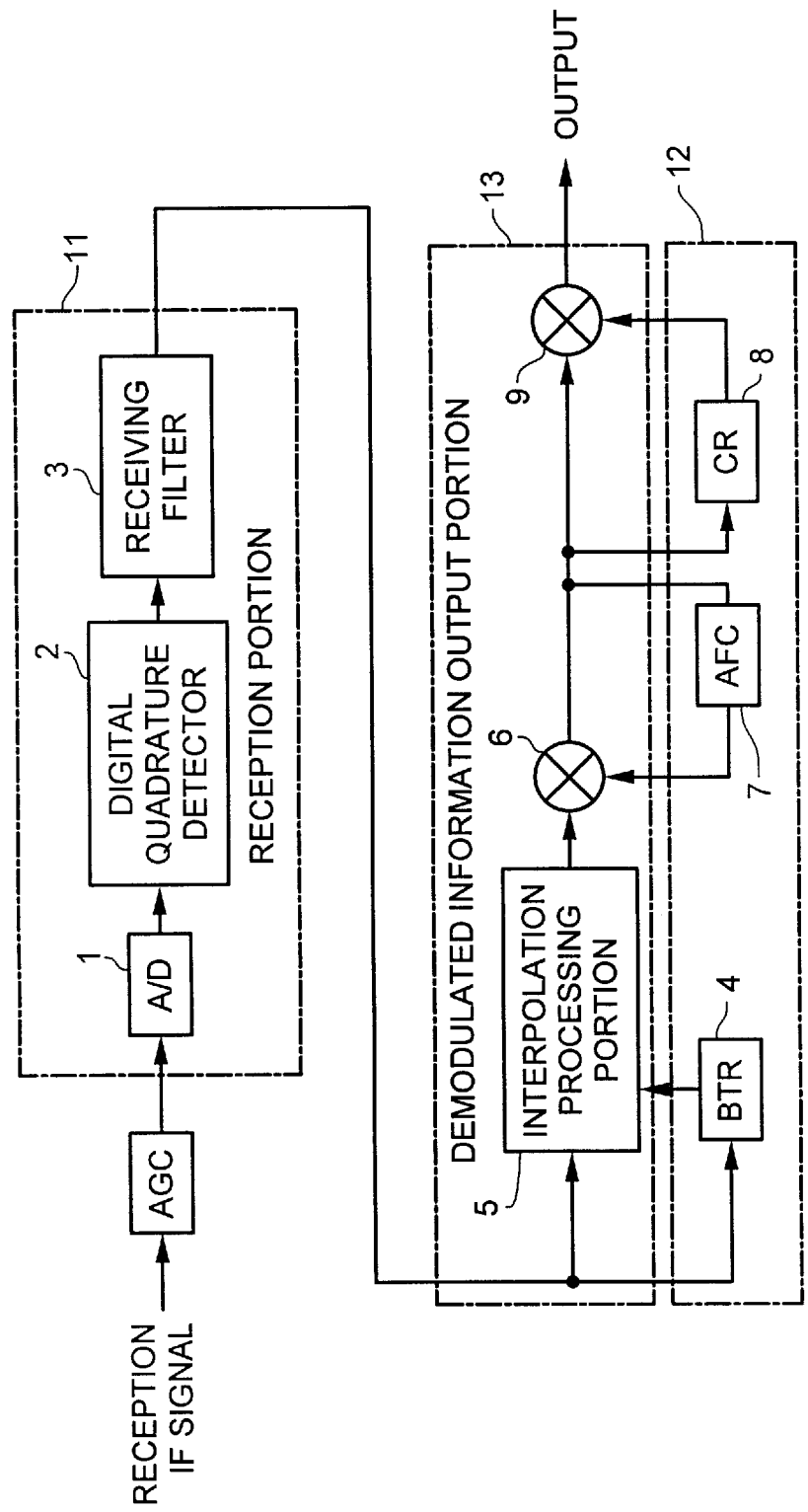
FIG. 7 shows a construction block diagram showing a conventional art.
Figure 8:
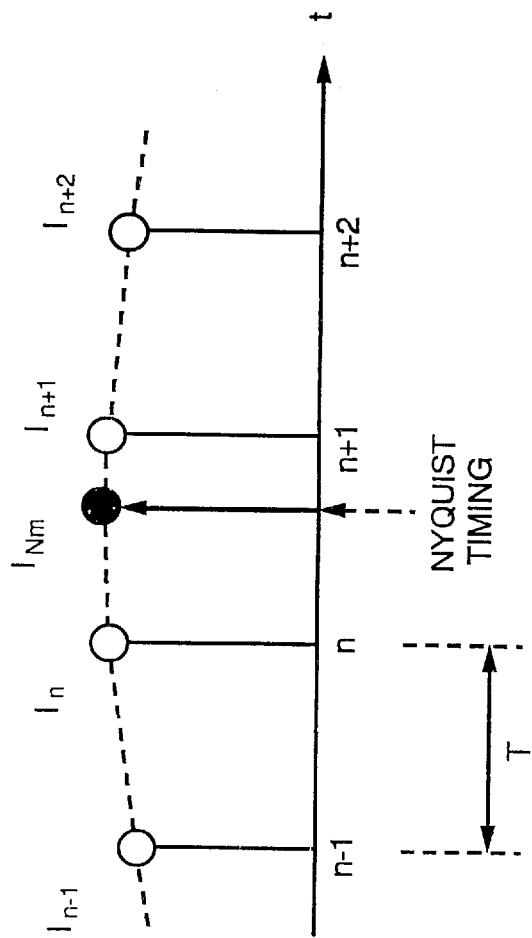
FIG. 8 shows a diagram showing an operation of interpolation processing.

The CR memory 23 constitutes one part of the storage portion 14. This CR memory 23 is connected to the UW detector and the CR 8. When the first signal is outputted from the UW detector, the CR memory 23 stores the CR parameter, which is the information of phase difference $\theta_N$ estimated by the CR 8 into the CR memory 23 itself. When the second signal is outputted from UW detection element 30, the CR memory 23 outputs the CR parameter, which is stored in the CR memory 23, to the CR 8. The elements having the same reference numbers in FIG. 1 are the same portions or the corresponding portions in the conventional art in FIG. 7. Accordingly the detailed explanation of the same portions in FIG. 1 is omitted. The only differences between the two figures arc explained below.

An operation of the first embodiment shown in FIG. 1 is explained below. 5 Since the process for correcting the signal inputted from the demodulator is the same as the conventional process, it is not explained here. The output signal from the second multiplier 9 is inputted into the UW detector 30. The UW detector 30 judges whether the UW is detected in the input signal. When the UW is detected, the first signal is outputted. When the correct signal cannot be received into the BTR 4, AFC 7 and CR 8 because the reception state deteriorates by fading or blockage, the demodulation cannot be completed because each part estimates correction parameter based on the incorrect signal and the demodulation of the input signal is carried out based on the incorrect correction parameter, and therefore the UW cannot be not detected, the second signal is outputted from the UW detector 30.

These first signal and the second signal are periodically outputted to the BTR memory 21, AFC memory 22 and CR memory 23. The output timing is utilized as an operation timing information of the BTR memory 21, AFC memory 22 and CR memory 23.

When the first signal is outputted from the UW detector 30, the BTR memory 21 stores the BTR parameter estimated by the BTR 4. When the second signal is outputted from the UW detector 30, the BTR memory 21 outputs the latest BTR parameter stored in the BTR memory 21 to the BTR 4. The BTR 4 which has received the BTR parameter outputted from the BTR memory 21 stores this BTR parameter. The BTR 4 further continues to carry out the estimation using the stored BTR parameter as an initial value according to the input signal, and carries out the processing operation.

When the first signal is outputted from the UW detector 30, the CR memory 22 stores the CR parameter estimated by the AFC 7. When the second signal is outputted from the UW detector 30, the AFC memory 22 outputs the latest AFC parameter stored in the AFC memory 22 to the AFC 7. The AFC 7 further continues to carry out the estimation using the stored AFC parameter as an initial value according to the input signal, and carries out the processing operation.

When the first signal is outputted from the UW detector 30, the CR memory 23 stores the CR parameter estimated by the CR 8. When the second signal is outputted from the UW detector 30, the CR memory 23 outputs the latest CR parameter stored in the CR memory 23 to the CR 8. The CR 8 further continues to carry out the estimation using the stored CR parameter as an initial value according to the input signal, and carries out the processing operation.

Figure 2:
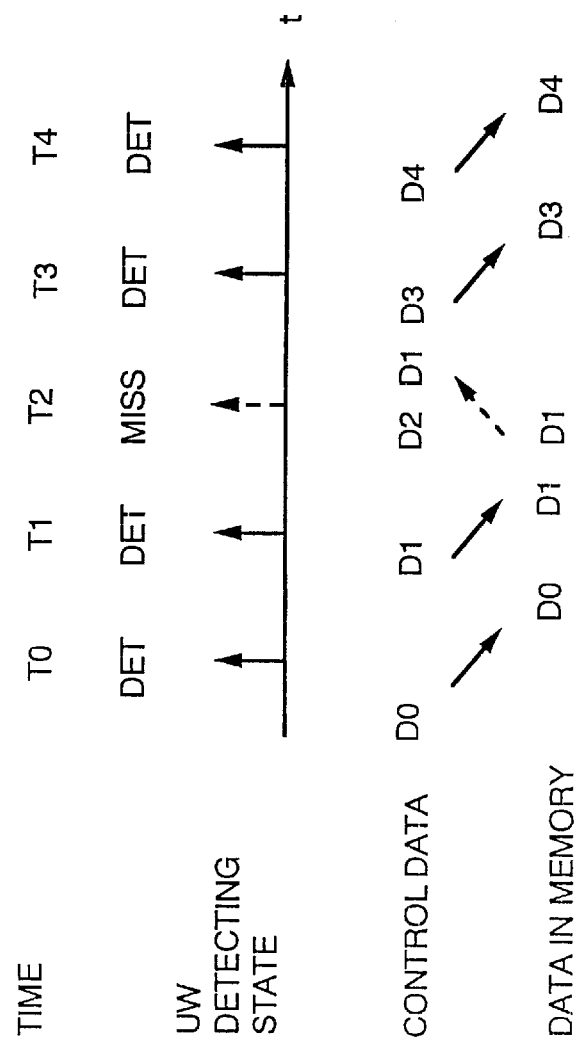
FIG. 2 shows a block diagram showing an operation of the first embodiment.

FIG. 2 indicates an operation of a first embodiment shown in FIG. 1 of this invention. The operation is explained in reference to FIG. 2. In FIG. 2, the detecting state indicates whether the signal outputted from the UW detector is a first signal "DET", or a second signal "MISS".

At first, at time T0, the UW detector 30 detects UW, and outputs the first signal "DET" based on this first signal "DET". The correction parameter output portion 12 estimates the correction parameter D0 as a control data, and outputs the correction parameter D0 to the storage portion 14 connected to the correction parameter output portion 12. The storage portion 14 stores the correction parameter D0. Secondly, at the time T1, the correction parameter output portion 12 estimates the correction parameter D1. The correction parameter D1 is stored in the storage portion 14 connected to the correction parameter output portion 12 in the same way as at time T0.

Thirdly, at the time T2, assuming that the correct signal cannot be received into the BTR 4, AFC 7 and CR 8 because the reception state is deteriorated by fading or blockage, the demodulation cannot be completed because each part estimates correction parameter based on the incorrect signal and the demodulation of the input signal is carried out based on the incorrect correction parameter, and therefore the UW cannot be not detected. As a result, the UW detector 30 outputs the second signal "MISS". The correction parameter D2 which has been estimated by the correction parameter output portion 12 based on the second signal "MISS", is not stored. On the other hand, the correction parameter D1, which has been detected at the time T1 just before the time T2, is outputted from the storage portion 14 connected to the correction parameter output portion 12 to the correction parameter output portion 12 connected to the storage portion 14 to store it therein.

The correction parameter output portion 12 stored with the correction parameter continues to carry out the estimation using the stored correction parameter D1 as an initial value according to the input signal, and carries out the processing operation.

Then at the time T3, the UW detector 30 detects the UW once again, and outputs the first signal "DET". The correction parameter output portion 12 outputs the correction parameter D3, which is once again estimated, to the storage portion 14 connected to the correction parameter output portion 12 to stores it therein.

In this manner, the demodulator of the embodiment of the invention shown in FIG. 1, operates based on FIG. 2. The demodulator comprises the A/D converter 1, the digital quadrature detector 2, the receiving filter 3, the BTR 4, the interpolation processing portion 5, the first multiplier 6, the AFC 7, the CR 8, the second multiplier 9, the UW detector 30, the BTR memory 21, the AFC memory 22 and the CR memory 23.

The signal outputted from the second multiplier 9 is inputted into the UW detector 30. The UW detector 30 judges whether UW is detected from the input signal or not. The UW detector 30 periodically outputs the first signal when UW is detected, and the second signal when UW is not detected, to the storage portion 14 which comprises the BTR memory 21, the AFC memory 22 and the CR memory 23.

When the storage portion 14 receives the first signal from UW detector 30, the storage portion 14 stores the correction parameter estimated by the correction parameter output portion 12 consisted of the BTR 4, AFC 7 and the CR 8. In contrast, when the storage portion 14 receives the second signal from the UW detector 30, the latest correction parameter stored in the storage portion 14 is outputted to the correction parameter output portion 12 which is connected to the storage portion 14. The each correction parameter output portion 12 connected to the respective storage portion 14 stores correction parameter input from each storage portion 14. The correction parameter output portion 12 continues to carry out the estimation using the stored parameter as an initial value according to the input signal, and carries out the processing operation.

In this manner, even if the reception state deteriorates below a threshold level and UW is not detected, the storage portion 14 outputs the correction parameter which corresponds the immediately preceding UW to the correction parameter output portion 12. Then the correction parameter output portion 12 carries out the estimation of further correction parameter according to the inputted signal, and outputs a new parameter. Therefore, when the reception state is recovered, the time needed until the estimation of the normal correction parameter begins can be shortened, and the time needed until the establishment of the synchronization begins again can also be shortened.

In case that the input signal includes a signal for detecting bit errors, the signal for detecting the bit errors may be used as the second signal. An automatic gain control circuit, which controls the power of input signal within the range the demodulator can operate, may also be used as a correction parameter output portion 12. Although the coherent detection is used as an example for demodulation method above, a delayed detection or frequency detection may also be used as the demodulation method.

Embodiment 2.

Figure 3:
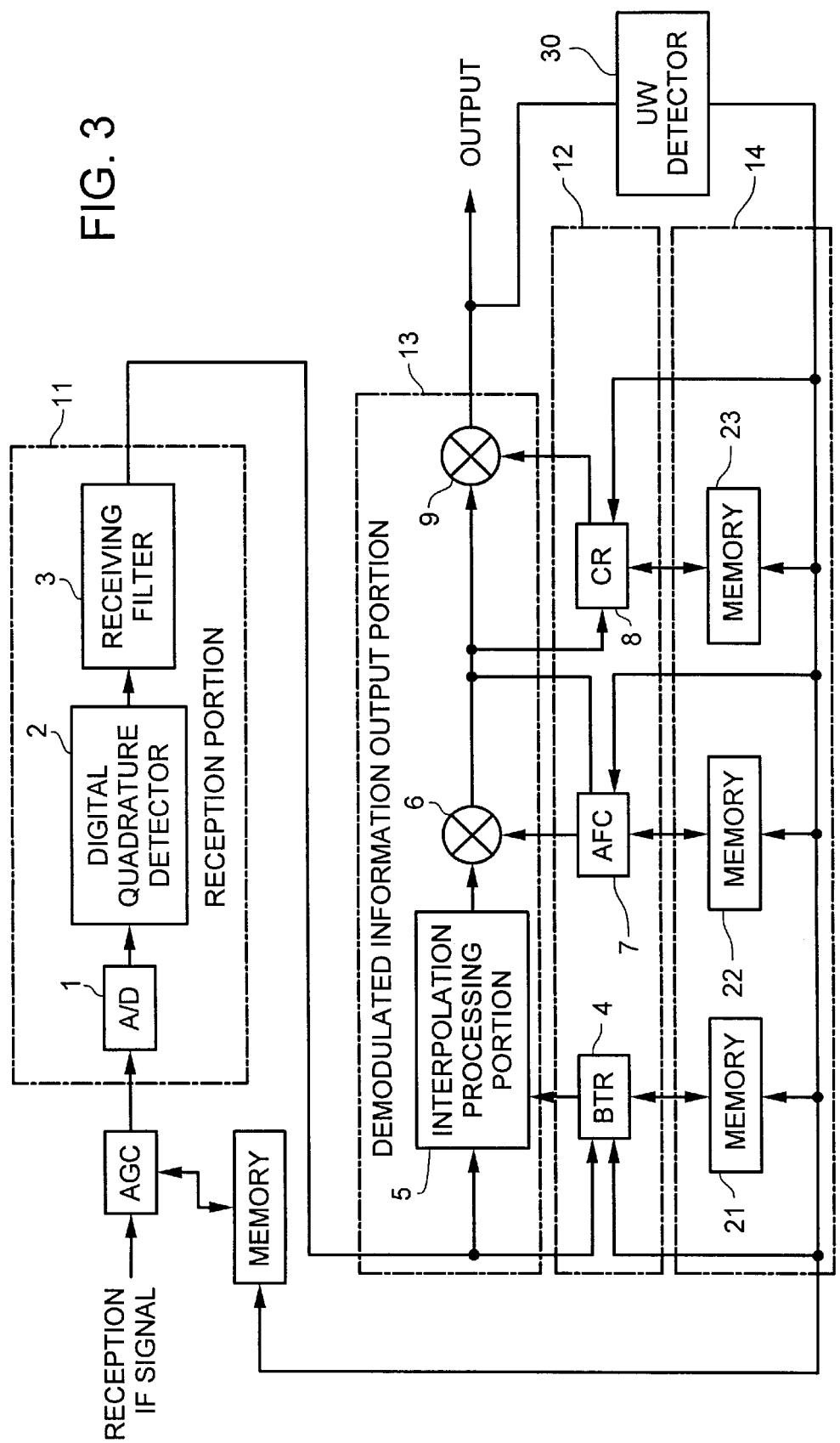
FIG. 3 shows a construction block diagram showing a second embodiment.

Another embodiment of this invention is explained below using FIG. 3. In FIG. 3, the UW detector 30 is connected to the second multiplier 9. The UW detector 30 receives the output signal from the second multiplier 9, and judges whether UW is detected from the input signal. The UW detector 30 outputs a first signal when the UW is detected, and a second signal when the UW is not detected, to a BTR 4, a BTR memory 21, an AFC 7, an AFC memory 22, a CR 8 and a CR memory 23. The BTR memory 21 is connected to the UW detector 30 and the BTR 4. When the first signal is inputted from the UW detector 30, the BTR memory 21 stores the BTR parameter calculated by the BTR 4. When the second signal is inputted from the UW detector 30, on the other hand, the BTR memory 21 outputs the latest BTR parameter stored in the BTR memory 21 to the BTR 4.

The BTR 4 is connected to the UW detector 30 and the BTR memory 21. When the first signal is inputted into the BTR 4, the BTR 4 calculates the BTR parameter, and outputs the BTR parameter to the BTR memory 21. When the second signal is inputted into the BTR 4, the BTR 4 receives the BTR parameter stored in the BTR memory 21, and stores it until the first signal is received again. This BTR 4 also performs the processing operation according to the inputted BTR parameter. When the first signal is inputted into the BTR memory 21 and the BTR 4 again, the BTR parameter stored in the BTR 4 is outputted to the BTR memory 21, and is stored in the BTR memory 21.

The AFC memory 22 is connected to the UW detector 30 and the AFC 7. When the first signal is inputted from the UW detector 30, the AFC memory 22 stores the AFC parameter calculated by the AFC 7. When the second signal is inputted from the UW detector 30, the AFC memory 22 outputs the latest AFC parameter stored in the AFC memory 22 to the AFC 7.

The AFC 7 is connected to the UW detector 30 and the AFC memory 22. When the first signal is inputted from the UW detector 30, the AFC 7 calculates an AFC parameter and outputs it to the AFC memory 22. When the second signal is inputted from the UW detector 30, the AFC 7 receives the AFC parameter stored in the AFC memory 22 and stores it until the first signal is received again. This AFC 7 also performs the processing operation according to the inputted AFC parameter.

When the first signal is inputted into the AFC memory 22 and AFC 7 again, the AFC parameter stored at AFC 7 is outputted to the AFC memory 22, and is stored in the AFC memory 22.

The CR memory 23 is connected to the UW detector 30 and the CR 8. When the first signal is inputted from the UW detector, the CR memory 23 stores the CR parameter calculated by the CR 8. When the second signal is inputted, the latest parameter stored in the CR memory 23 is outputted to the CR 8.

The CR 8 is connected to the UW detector 30 and the CR memory 23. When the first signal is inputted from the UW detector 30, the CR 8 calculates the CR parameter, and outputs the CR parameter to the CR memory 23. When the second signal is inputted from the UW detector 30, the CR 8 receives the CR parameter stored in the CR memory 23, and saves it until the first signal is received again. This CR 8 also performs the processing operation according to the inputted CR parameter. When the first signal is inputted to the CR memory 23 and the CR 8 again, the CR parameter stored in the CR 8 is outputted to the CR memory 23, and is stored in the CR memory 23.

The elements having the same reference numbers in FIG. 3 are the same portions or the corresponding portions in the conventional art in FIG. 1. Accordingly the detailed explanation of the same portions in FIG. 3 is omitted. The only differences between the two figures are explained below.

An operation of the first embodiment shown in FIG. 3 is explained below. Since the process for correcting the signal inputted from the demodulator is the same as the conventional process, it is not explained here. The signal outputted from the second multiplier 9 is inputted into the UW detector 30. The UW detector 30 judges whether the UW is detected in the input signal. When the UW is detected, the first signal is outputted.

When the correct signal cannot be received into the BTR 4, AFC 7 and CR 8 because the reception state deteriorates by fading or blockage, the demodulation cannot be completed because each part estimates correction parameter based on the incorrect signal and the demodulation of the input signal is carried out based on the incorrect correction parameter, and therefore the UW cannot be detected, the second signal is outputted from the UW detector 30.

These first signal and the second signal are periodically outputted to the BTR 4, BTR memory 21, AFC 7, AFC memory 22, CR 8 and CR memory 23. The output timing is utilized as an operation timing information of the BTR memory 21, AFC memory 22 and CR memory 23.

When the first signal from the UW detector 30 is inputted into the BTR memory 21 and the BTR 4, the BTR parameter calculated by BTR 4 is outputted from the BTR 4 to the BTR memory 21, and is stored in the BTR memory 21.

When the second signal from the UW detector 30 is inputted into the BTR memory 21 and the BTR 4, the latest BTR parameter stored in the BTR memory 21 is outputted from the BTR memory 21 to the BTR 4, and is stored in the BTR 4. In this situation, the BTR 4 uses the stored BTR parameter as it is to perform the processing operation. This processing operation continues until the first signal is inputted into the BTR memory 21 and the BTR 4. Then, when the first signal is inputted into the BTR memory 21 and the BTR 4 again, the BTR parameter stored in the BTR 4 is outputted to the BTR memory 21, and is stored in the BTR memory 21.

When the first signal from the UW detector 30 is inputted into the AFC memory 22 and the AFC 7, the parameter calculated by AFC 7 is outputted from AFC 7 into the AFC memory 22, and is stored in the AFC memory 22.

When the second signal from the UW detector is inputted into the AFC memory 22 and AFC 7, the latest AFC parameter stored in the AFC memory 22 is outputted from the AFC memory 22 into the AFC 7, and is stored in AFC 7. In this situation, the AFC 7 directly uses the stored AFC parameter to perform a processing operation. This processing operation continues until the first signal is inputted into the AFC memory 22 and AFC 7. When the first signal is inputted into the AFC memory 22 and AFC 7, the AFC parameter stored in AFC 7 is outputted to the AFC memory 22, and is stored in the AFC memory 22.

When the first signal from the UW detector 30 is inputted into the CR memory 23 and the CR 8, the CR parameter calculated by the CR 8 is outputted from the CR 8 to the CR memory 23, and is stored in the CR memory 23. When the second signal from the UW detector 30 is inputted into the CR memory 23 and the CR 8, the latest CR parameter stored in the CR memory 23 is outputted from the CR memory 23 to the CR 8, and is stored in the CR 8. In this situation, the CR 8 uses the stored CR parameter as it is to perform a processing operation. This processing operation continues until the first signal is inputted into these the CR memory 23 and the CR 8. When the first signal is inputted into the CR memory 23 and the CR 8 again, the CR parameter stored in the CR 8 is outputted to the CR memory 23, and is stored in the CR memory 23.

Figure 4:
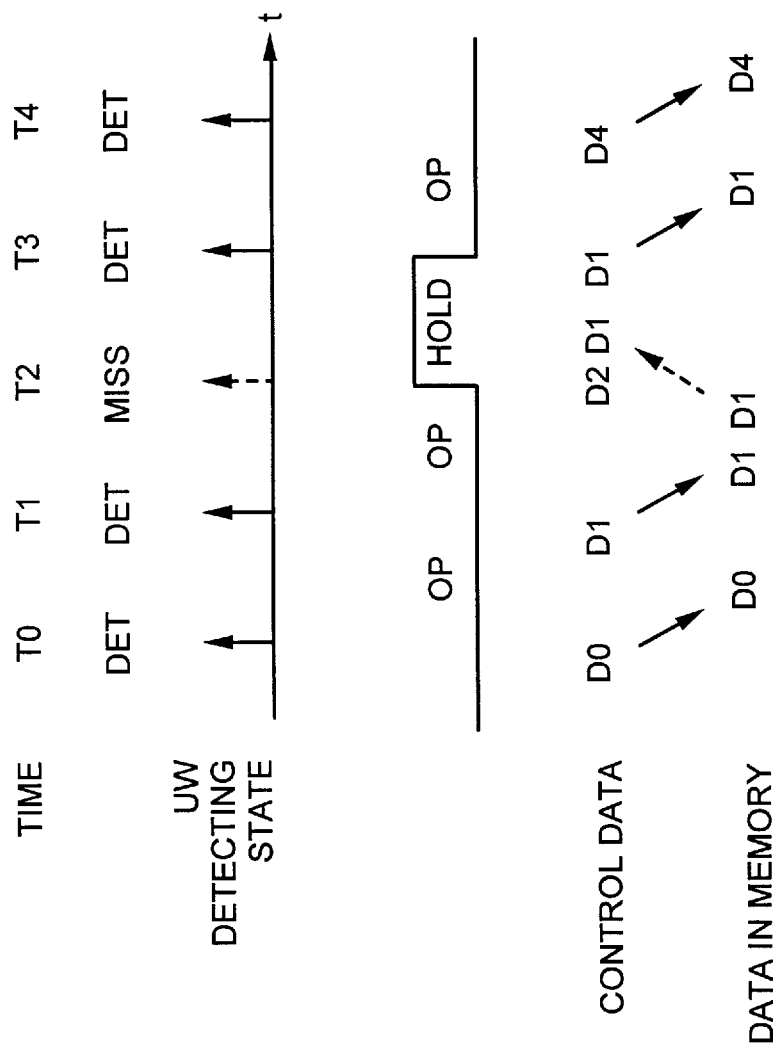
FIG. 4 shows a diagram showing an operation of the second embodiment.

FIG. 4 indicates an operation of a second embodiment shown in FIG. 3 of this invention. The operation is explained in reference to FIG. 4. In FIG. 4, the detecting state indicates whether the signal outputted from the UW detector is a first signal "DET", or a second signal "MISS". At time T0, the UW detector 30 detects UW, and outputs the first signal "DET". At this time, the operation mode is indicated as a normal operation "OP".

Based on this first signal "DET", the correction parameter output portion 12 estimates the correction parameter D0 as a control data, and outputs the correction parameter D0 to the storage portion 14 connected to the correction parameter output portion 12. The storage portion 14 stores the correction parameter D0. At the time T1, the correction parameter output portion 12 estimates the correction parameter D1. The correction parameter D1 is stored in the storage portion 14 connected to the correction parameter output portion 12 in the same way as at time T0.

At the time T2, assuming that the correct signal cannot be received into the BTR 4, AFC 7 and CR 8 because the reception state deteriorates by fading or blockage, the demodulation cannot be completed because each part estimates correction parameter based on the incorrect signal and the demodulation of the input signal is carried out based on the incorrect correction parameter, and therefore the UW cannot be detected. As a result, the UW detector 30 outputs the second signal "MISS". At this time, the operation mode is indicated as a storage hold operation "HOLD".

The correction parameter D2 which has been estimated by the correction parameter output portion 12 based on the second signal "MISS", is not stored. On the other hand, the correction parameter D1, which has been detected at the time T1 just before the time T2, is outputted from the storage portion 14 connected to the correction parameter output portion 12 to the correction parameter output portion 12 connected to the storage portion 14 to store it therein.

Then, the stored correction parameter, based on the operation mode storage hold operation "HOLD", is stored and held, until the first signal is inputted into the correction parameter output portion 12 again. The correction parameter output portion 12, which has received the correction parameter D1 from the storage portion 14, performs a processing operation by using the input correction parameter D1 as it is.

At the time T3, the first signal is outputted from the UW detector 30 to the correction parameter output portion 12. Then, the operation mode of the correction parameter output portion 12 turns to the normal operation "OP". Then, the correction parameter D1, which has been stored and held in the correction parameter output portion 12, is again outputted to the storage portion 14 connected to the correction parameter, and is stored therein.

The elements having the same reference numbers in FIG. 4 are the same portions or the corresponding portions in the conventional art in FIG. 2. Accordingly the detailed explanation of the same portions in FIG. 4 is omitted. The only differences between the two figures are explained below.

In this manner, the demodulator of the second embodiment of the invention shown in FIG. 3, operates base on FIG. 4. The demodulator comprises the A/D converter 1, the digital quadrature detector 2, the receiving filter 3, the BTR 4, the interpolation processing portion 5, the first multiplier 6, the AFC 7, the CR 8, the second multiplier 9, the UW detector 30, the BTR memory 21, the AFC memory 22 and the CR memory 23.

The signal outputted from the second multiplier 9 is inputted into the UW detector 30. The UW detector 30 judges whether UW is detected from the input signal or not. The UW detector 30 periodically outputs the first signal when UW is detected, and the second signal when UW is not detected, to the storage portion 14 and the memory portion.

When the first signal from the UW detector 30 is inputted into the correction parameter output portion 12 and storage portion 14, the correction parameter calculated by the correction parameter output portion 12 is outputted from the correction parameter output portion 12 to the storage portion 14, and is stored in the storage portion 14.

When the correction parameter output portion 12 and the storage portion 14 receives the second signal from the UW detector 30, the latest parameter stored in the storage portion 14 is outputted from the storage portion 14 to the correction parameter output portion 12, and is stored in the correction parameter output portion 12. In this case, the correction parameter output portion 12 uses the stored correction parameter as it is and performs the processing operation. This processing operation continues until the first signal is inputted into these correction parameter output portion 12 and the storage portion 14 again. Then, when the first signal is inputted into the storage portion 14 and the correction parameter portion, the correction parameter stored in the correction parameter output portion 12 is outputted to the storage portion 14, and is stored in the storage portion 14.

Therefore, even if the reception state deteriorates and the period in which the UW is not detected at the UW detector 30 is continued, the correction parameter at the time when UW has been detected is maintained to be outputted from the correction parameter output portion 12. Therefore, when the reception state gets better, the time needed until the estimation of the normal correction parameter begins can be shortened, and the time needed until the establishment of the synchronization begins again can also be shortened.

In addition to the above, when the correction parameter output portion 12 is provided in the demodulator, it is not necessary for all correction parameter output portion 12 to carry out the storage hold operation "HOLD". Some of the correction parameter output portion 12 may be selected to perform the storage hold operation "HOLD".

Embodiment 3.

Figure 5:
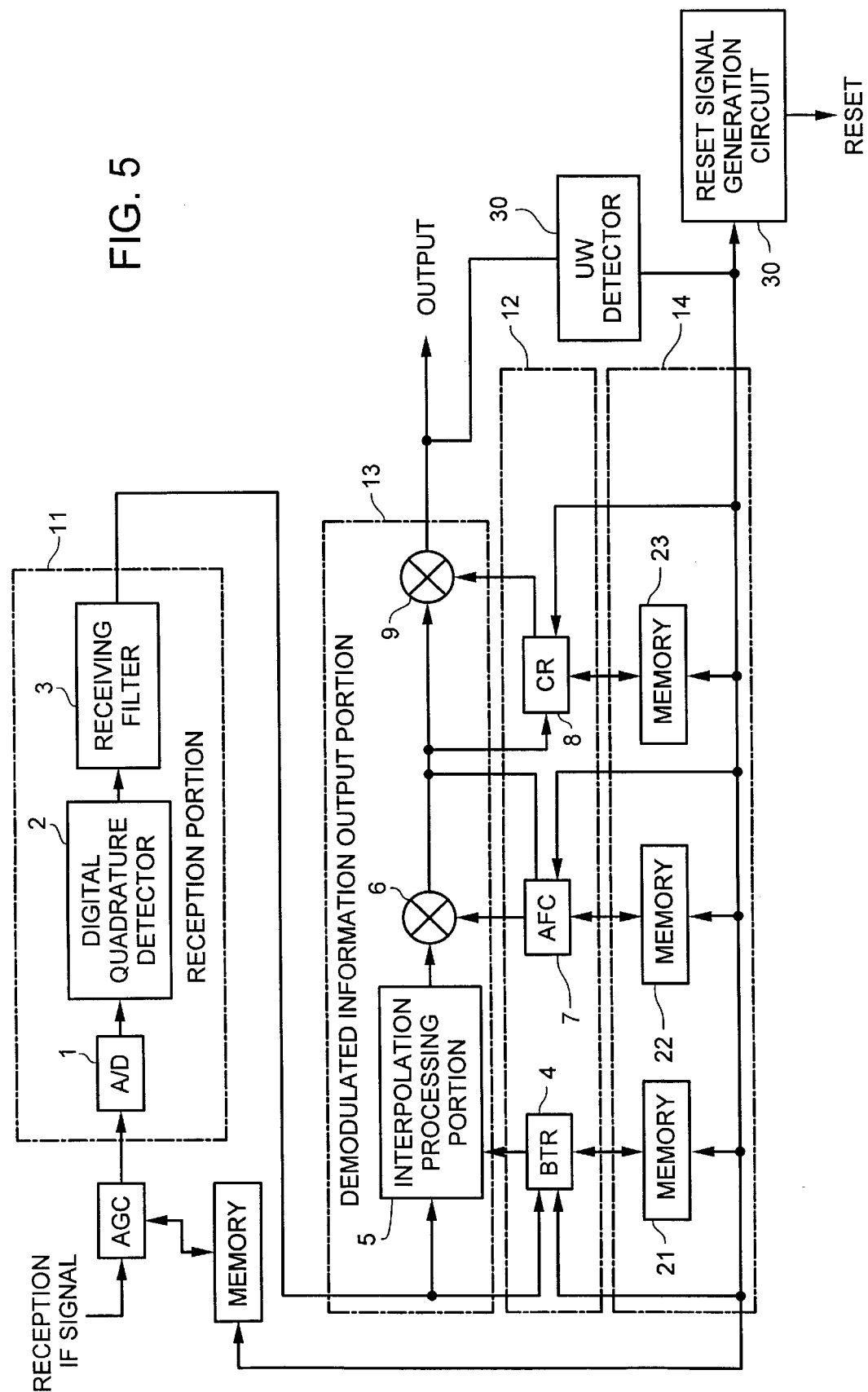
FIG. 5 shows a construction block diagram showing a third embodiment.

A third embodiment of this invention is explained below in reference to FIG. 5. In the third embodiment, a reset signal output portion 50 is equipped in addition to the second embodiment. In FIG. 5, the reset signal generation circuit 50 is connected to the UW detector 30 and outputs the reset signal.

The elements having the same reference numbers in FIG. 5 are the same portions or the corresponding portions in FIG. 1. Accordingly the detailed explanation of the same portions in FIG. 5 is omitted. The only differences between the two figures are explained below.

Next is an explanation of the operation of the embodiment 3 shown in FIG. 5. Since the process in which the signal inputted into demodulator is corrected is the same as the conventional method, its explanation is omitted. For instance, when the demodulator shown in FIG. 5 uses the time variant transmission path, the UW detector 30 outputs the second signal during a certain period because of the fading or blockage. Even after the fading or blockage has been removed, the fading or blockage signal is transmitted via the transmission path with delay, and inputted to the demodulator. Therefore, the demodulator demodulates, the delayed input signal, which means that the correction parameter stored in the storage portion 14 is not used effectively, that is, the correction parameter becomes meaningless. On the other hand, the correction parameter stored in the BTR 4, AFC 7 and the CR 8 is maintained as it is until the first signal is inputted into the BTR 4, AFC 7 and CR 8. Therefore, the signal outputted from the UW detector 30 continuously outputs the second signal. In order to demodulate the input signal after the transmission circuit has changed, it is necessary to re-estimate the correction parameter. As described above, when the second signal are outputted from the UW detector continuously for a certain period, the reset signal generation circuit 50 outputs the reset signal to some or all parameter output portions in the demodulator. The parameter output portion which has received the reset signal, again calculates the correction parameter, and performs the demodulation processing.

In this manner, the demodulator in the third embodiment as shown in FIG. 5, comprises the A/D converter 1, the digital quadrature detector 2, the receiving filter 3, the BTR 4, the interpolation processing portion 5, the first multiplier 6, the AFC 7, the CR 8, the second multiplier 9, the UW detector 30, the BTR memory 21, the AFC memory 22, the CR memory 23, and the reset signal generation circuit 50.

When the demodulator uses the time variant transmission path, the UW detector 30 outputs the second signal during a certain period because of the fading or blockage. Even after the fading or blockage has been removed, the fading or blockage signal is transmitted via the transmission path with delay, and inputted to the demodulator. Therefore, the demodulator cannot demodulate the input signal if the correction parameter stored in the storage portion 14 is used. During such period, if the second signal is continuously outputted from the UW detector 30, the outputs the second signal, the reset signal generation circuit 50 outputs the reset signal. The correction parameter output portion 12 which received the reset signal, again calculates the correction parameter, and performs the demodulation processing.

In this embodiment, even if the characteristic of the time variant transmission path varies and therefore the correction parameter changes, the correction parameter output portion 12 can calculate the new correction parameter without being affected by the stored correction parameter.

In addition, it is not necessarily to reset all correction parameter output portions 12 in the demodulator according to the reset signal. It is possible to have some correction parameter output portions 12 which are not reset. Also, it is not necessarily reset all the correction parameter output portions 12 in the demodulator at the same time based on the reset signal, it is possible to change the reset timing according to the time constant and so on.

Embodiment 4.

Figure 6:
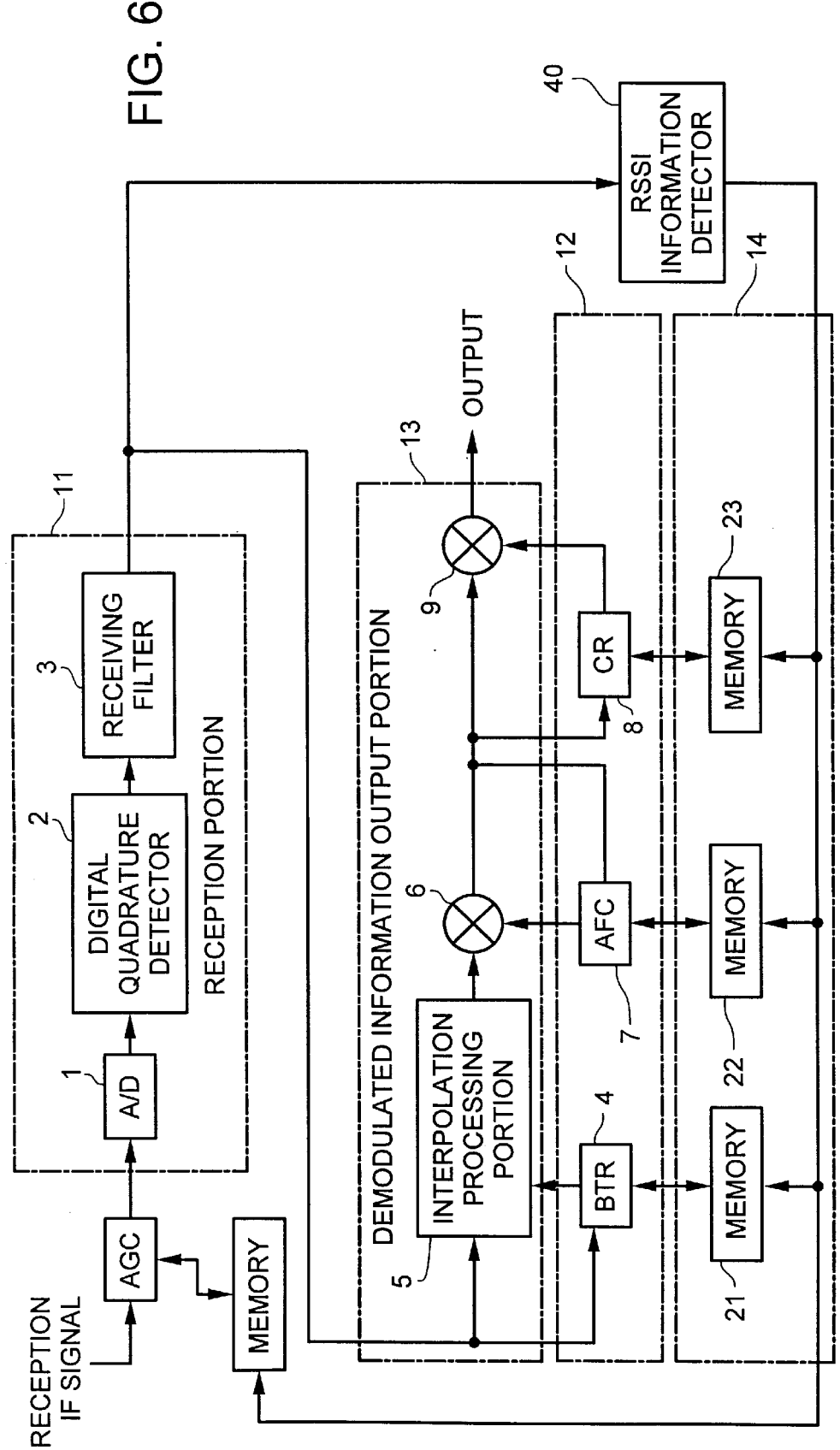
FIG. 6 shows a construction block diagram showing a fourth embodiment.

A fourth embodiment of this invention is explained using FIG. 6. In FIG. 6, the demodulator comprises an RSSI (Received Signal Strength Indicator) information detector 40. This RSSI information detector 40 is connected to the receiving filter 3. The RSSI information detector 40 receives the signal outputted from the receiving filter 3, and detects the percentage of noise included in the input signal. When the reception level is higher than a threshold level and also the percentage of the noise in the input signal is low, the RSSI information detector 40 outputs the first signal, and when the reception level is lower than a threshold level and also the percentage of the noise included in the input signal is high, the RSSI information detector 40 outputs the second signal, to the BTR memory 21, the AFC memory 22 and the CR memory 23.

The BTR memory 21 is connected to the RSSI information detector 40. When the first signal is outputted from the RSSI information detector 40, the BTR memory 21 receives the BTR parameter calculated by the BTR 4 and stores it in the BTR memory 21. On the other hand, when the second signal is inputted to the BTR memory 21, the BTR memory 21 outputs the latest BTR parameter stored in the BTR memory 21 to the BTR 4.

The AFC memory 22 is connected to the RSSI information detector 40 and the AFC 7. When the first signal is inputted from the RSSI information detector 40, the AFC memory 22 receives the AFC parameter calculated by the AFC 7, and stores it in the AFC memory 22. Also when the second signal is inputted from the information detector 40, the AFC memory 22 outputs the latest AFC parameter stored in the AFC memory 22 to the AFC 7.

The CR memory 23 is connected to the RSSI information detector 40 and the CR 8. When the first signal is inputted from the RSSI information detector 40, the CR memory 23 receives the CR parameter calculated by the CR 8, and stores it in the CR memory 23. Also, when the second signal is inputted, the CR memory 23 outputs the latest CR parameter stored in the CR memory 23 to the CR 8.

The elements having the same reference numbers in FIG. 6 are the same portions or the corresponding portions in the conventional art in FIG. 1. Accordingly the detailed explanation of the same portions in FIG. 6 is omitted. The only differences between the two figures are explained below.

The following is an explanation of the operation of the fourth embodiment shown in FIG. 6 of the present invention. Since the process in which the signal inputted into demodulator is corrected is the same as the conventional method, its explanation is omitted. In FIG. 6, the signal outputted from receiving filter 3 is inputted into the RSSI information detector 40. The RSSI information detector detects the percentage of the noise included in the input signal and outputs the first signal if the reception level is higher than a threshold level and the percentage of the noise included in the input signal is low.

Contrary, if the reception state deteriorates below a threshold level is because of fading or blockage and the percentage of the noise included in the input signal is high, the second signal is output. These first and second signals are periodically outputted to the BTR memory 21, the AFC memory 21 and the CR memory 23.

When the first signal is outputted from the RSSI information detector 40, the BTR memory 21 stores the BTR parameter estimated by the BTR 4. When the second signal is outputted from the RSSI information detector 40, the BTR memory 21 outputs the latest BTR parameter stored in the BTR memory 21 to the BTR 4.

When the BTR 4 receives the BTR parameter from the BTR memory 21, the BTR 4 stores the BTR parameter, further continues to carry out the estimation using the stored BTR parameter as an initial value according to the input signal, and carries out the processing operation. When the first signal is inputted from the RSSI information detector 40, the AFC memory 22 stores the AFC parameter estimated by the AFC 7 therein.

When the second signal is inputted from the RSSI information detector 40, the AFC memory 22 outputs the latest AFC parameter stored in the AFC memory 22 to the AFC 7. When receiving the AFC parameter outputted from the AFC memory 22, the AFC 7 stores this AFC parameter. Then the AFC 7 further continues to carry out the estimation using the stored AFC parameter as an initial value according to the input signal, and carries out the processing operation.

When the first signal is outputted from the RSSI information detector 40, the CR memory 23 stores the CR parameter estimated by the CR 8. On the other hand, when the second signal is inputted from the RSSI information detector 40, the CR memory 23 outputs the latest CR parameter stored in the CR memory 23 to the CR 8. When the CR parameter is inputted from the CR memory 23, the CR 8 stores the CR parameter therein, further continues to carry out the estimation using the stored CR parameter as an initial value according to the input signal, and carries out the processing operation.

In this manner, the demodulator in the fourth embodiment as shown in FIG. 6, comprises the A/D converter 1, the digital quadrature detector 2, the receiving filter 3, the BTR 4, the interpolation processing portion 5, the first multiplier 6, the AFC 7, the CR 8, the second multiplier 9, the RSSI 40, the BTR memory 21, the AFC memory 22, and the CR memory 23.

The signal outputted from receiving filter 3 is inputted into the RSSI information detector 40. The RSSI information detector detects the percentage of the noise included in the input signal and outputs the first signal if the percentage of the noise included in the input signal is low.

When the reception state is deteriorated because of fading or blockage and the percentage of the noise included in the input signal is high, the second signal is outputted. These first and second signals are periodically outputted to the BTR memory 21, the AFC memory 21 and the CR memory 23.

When the first signal is outputted from the RSSI information detector 40, the storage portion 14 of the BTR memory 21, the AFC memory 22 and the CR memory 23 receive the correction parameter estimated by the correction parameter output portion 12, which is connected to the respective storage portion 14, and store the correction parameter therein. When the second signal is outputted from the RSSI information detector 40, the storage portion 14 outputs the latest correction parameters stored in the respective storage portion 14 to the correction parameter output portion 12, which are connected to the respective storage portion 14.

The correction parameter output portion 12 receives each correction parameter outputted from the storage portion 14, and stores them therein. This correction parameter output portion 12 continues to carry out the estimation using the stored parameter as an initial value according to the input signal, and carries out the processing operation.

In this manner, even if the reception state deteriorates and therefore the second signal is outputted, since the demodulator operates using the correction parameter which is calculated when the first signal is outputted, the time needed until the estimation of the normal correction parameter begins can be shortened, and the time needed until the establishment of the synchronization begins again can also be shortened. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A demodulator comprising:

a reception portion for receiving a communication signal including predetermined information outputted from a modulator;

a correction parameter output portion connected to said reception portion for outputting a correction parameter based on the communication signal;

a demodulated information output portion connected to said reception portion and said correction parameter output portion for outputting demodulated information based on the communication signal and the correction parameter;

a detector for detecting whether said demodulated information includes said predetermined information, for outputting a first signal when said predetermined information is detected and for outputting a second signal when said predetermined information is not detected; and a storage portion connected to said detector for storing the correction parameter outputted from said correction parameter when the first signal is inputted, and for outputting a stored correction parameter to said correction parameter output portion when said second signal is inputted.

2. The demodulator according to claim 1, wherein said correction parameter is any one of a parameter for controlling processing timing of communication signal, a parameter for controlling frequency, and a parameter for controlling a phase of a carrier to correctly determine the data.

3. The demodulator according to claim 2, wherein said predetermined information is an information signal periodically inserted in the communication signal outputted from the modulator.

4. The demodulator according to claim 1, wherein said correction parameter output portion is connected to the detector and the storage portion, said correction parameter output portion outputs the correction parameter inputted from the storage portion when said detector outputs the second signal, and outputs the correction parameter based on the communication signal inputted from the reception portion when said detector outputs the first signal.

5. The demodulator according to claim 4, wherein said correction parameter is any one of a parameter for controlling processing timing of communication signal, a parameter for controlling frequency, and a parameter for controlling a phase of a carrier to correctly determine the data.

6. The demodulator according to claim 5, wherein said predetermined information is an information signal periodically inserted in the communication signal outputted from the modulator.

7. The demodulator according to claim 1 further comprising:

a reset signal output portion connected to the detector for outputting a reset signal when the detector successively outputs the second signal.

8. The demodulator according to claim 4 further comprising:

a reset signal output portion connected to the detector for outputting a reset signal when the detector successively outputs the second signal.

9. A demodulator comprising:

a reception portion for receiving a communication signal outputted from a modulator;

a correction parameter output portion connected to said reception portion for outputting a correction parameter based on the communication signal;

a demodulated information output portion connected to said reception portion and said correction parameter output portion for outputting demodulated information based on the communication signal and the correction parameter;

a level signal output portion connected to said reception portion for outputting a first signal when a receiving level of said communication signal is higher than a threshold level, and outputs a second signal when a receiving level of said communication signal is lower than a threshold level; and a storage portion connected to said level signal output portion for storing the correction parameter outputted from said correction parameter when the first signal is inputted, and for outputting a stored correction parameter to said correction parameter output portion when said second signal is inputted.

10. A demodulator comprising:

detection means for detecting whether a predetermined condition is present in a communication signal, for outputting a first signal when the predetermined condition is present and for outputting a second signal when the predetermined condition is not present; and storage means, connected to said detection means, for storing a correction parameter when said detection means outputs the first signal and for outputting the stored correction parameter when said detection means outputs the second signal.

11. The demodulator according to claim 10, wherein the predetermined condition is an information signal periodically inserted in the communication signal.

12. The demodulator according to claim 10, wherein the predetermined condition is present when a level of the communication signal is higher than a threshold level.

13. The demodulator according to claim 10, further comprising correction parameter output means connected to said detection means and said storage means, for generating a correction parameter based on the communication signal, for outputting the correction parameter based on the communication signal when said detection means outputs the first signal, and for outputting the correction parameter from said storage means when said detection means outputs the second signal.

14. The demodulator according to claim 13, wherein said correction parameter output means continuously outputs the correction parameter from said storage means when said detection means outputs the second signal until said detection means outputs the first signal.

15. A demodulator comprising:

demodulated information generating means for generating demodulated information based on a communication signal;

detection means, connected to said demodulated information generating means, for detecting whether a predetermined condition is present in at least one of the communication signal and the demodulated information, for outputting a first signal when the predetermined condition is present and for outputting a second signal when the predetermined condition is not present; and storage means, connected to said detection means, for storing a correction parameter when said detection means outputs the first signal and for outputting the stored correction parameter when said detection means outputs the second signal.

16. The demodulator according to claim 15, wherein the predetermined condition is an information signal periodically inserted in the demodulated information.

17. The demodulator according to claim 15, wherein the predetermined condition is present when a level of the communication signal is higher than a threshold level.

18. The demodulator according to claim 15, wherein said demodulated information generating means includes, correction parameter output means, connected to said detection means and said storage means, for generating a correction parameter based on the communication signal, for outputting the correction parameter based on the communication signal when said detection means outputs the first signal, and for outputting the correction parameter from said storage means when the detection means outputs the second signal.

19. The demodulator according to claim 18, wherein said correction parameter output means continuously outputs the correction parameter from said storage means when said detection means outputs the second signal until said detection means outputs the first signal.

* * * * *